United States Patent
Pelc et al.

(10) Patent No.: US 7,738,563 B2
(45) Date of Patent: Jun. 15, 2010

(54) METHOD AND SYSTEM FOR PERFORMING DEBLOCKING FILTERING

(75) Inventors: Oskar Pelc, Even Yehuda (IL); Michael Zarubinsky, Rishon Lezion (IL); David Young, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 1490 days.

(21) Appl. No.: 10/887,132

(22) Filed: Jul. 8, 2004

(65) Prior Publication Data

US 2006/0008013 A1 Jan. 12, 2006

(51) Int. Cl.
*H04N 7/12* (2006.01)
*G06K 9/40* (2006.01)

(52) U.S. Cl. .................. 375/240.29; 382/268
(58) Field of Classification Search ............. 348/420, 348/405, 403, 409, 407, 415, 416, 400, 414, 348/418, 422; 375/240.18, 240.29, 240.24, 375/240.16, 240.12; 382/268, 232
See application file for complete search history.

(56) References Cited

U.S. PATENT DOCUMENTS

| | | | | |
|---|---|---|---|---|
| 6,539,060 | B1 * | 3/2003 | Lee et al. ............... | 375/240.29 |
| 6,859,499 | B2 * | 2/2005 | Hashimoto ............. | 375/240.27 |
| 6,917,310 | B2 * | 7/2005 | Pearson et al. ........... | 341/50 |
| 7,362,810 | B2 * | 4/2008 | Wang ..................... | 375/240.29 |
| 2001/0020906 | A1 | 9/2001 | Andrews et al. | |
| 2002/0051496 | A1 * | 5/2002 | Hashimoto ............. | 375/240.27 |
| 2003/0185305 | A1 * | 10/2003 | MacInnis et al. ....... | 375/240.25 |
| 2003/0185306 | A1 * | 10/2003 | MacInnis et al. ....... | 375/240.25 |
| 2003/0219074 | A1 * | 11/2003 | Park et al. .............. | 375/240.29 |
| 2004/0076237 | A1 | 4/2004 | Kadono et al. | |
| 2004/0228415 | A1 * | 11/2004 | Wang ..................... | 375/240.29 |
| 2004/0263361 | A1 * | 12/2004 | Pearson et al. .......... | 341/50 |
| 2005/0117653 | A1 * | 6/2005 | Sankaran ................ | 375/240.24 |
| 2006/0126955 | A1 * | 6/2006 | Srinivasan .............. | 382/239 |
| 2007/0098077 | A1 * | 5/2007 | Sun et al. ............... | 375/240.18 |

OTHER PUBLICATIONS

List, et al "Adaptive Deblocking Filter", IEEE Transactions On Circuits and Systems For Video Technology, Jul. 2003, pp. 614-619, vol. 13, No. 7, New York, USA.
Sima, et al "An Efficient Architecture For Adaptive Deblocking Filter of H.264/AVC Video Coding", IEEE Transactions On Consumer Electronics, Feb. 2004, pp. 292-296, vol. 50, No. 1, New York, USA.
PCT Search Report and Written Opinion, PCT/IB2005/052226, mailed Nov. 8, 2005.

* cited by examiner

*Primary Examiner*—Behrooz Senfi

(57) ABSTRACT

A system and method for filtering a frame, the method includes: (i) processing, by a processing unit executing instructions, at least one portion of a frame to provide at least one processed frame portion; (ii) performing, by a hardware filter, deblocking filtering of the at least one processed frame portion to provide at least one filtered frame portion; and (ii) storing the at least one filtered frame portion in a memory unit that is accessible by the processing unit; whereas the stage of processing is responsive to previously filtered frame portions. The system includes: (i) a processing unit, adapted to execute instructions such as to process at least one portion of a frame to provide at least one processed frame portion; (ii) a hardware filter, connected to the processing unit, adapted to deblocking filter the at least one processed frame portion to provide at least one filtered frame portion; and (iii) a memory unit, connected to the processing unit, adapted to store the at least one filtered frame portion; whereas the processing unit is adapted to process the at least one portion in response to previously filtered frame portions.

30 Claims, 6 Drawing Sheets

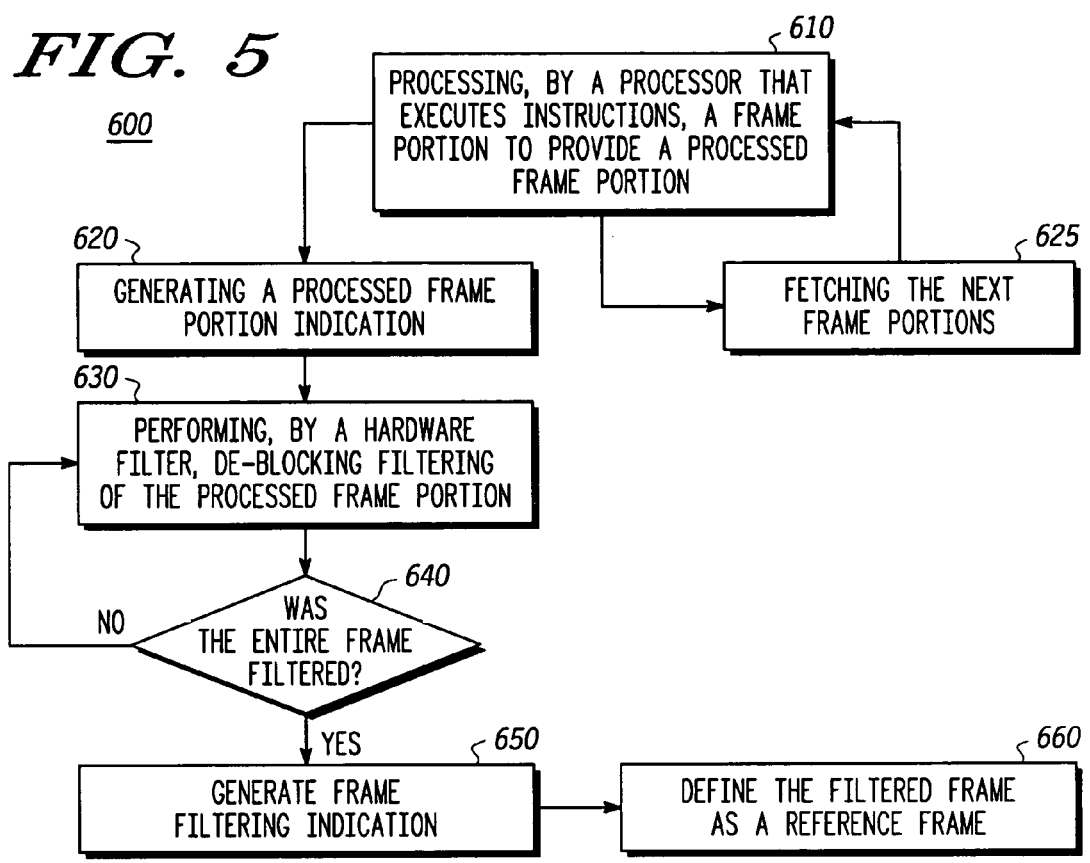
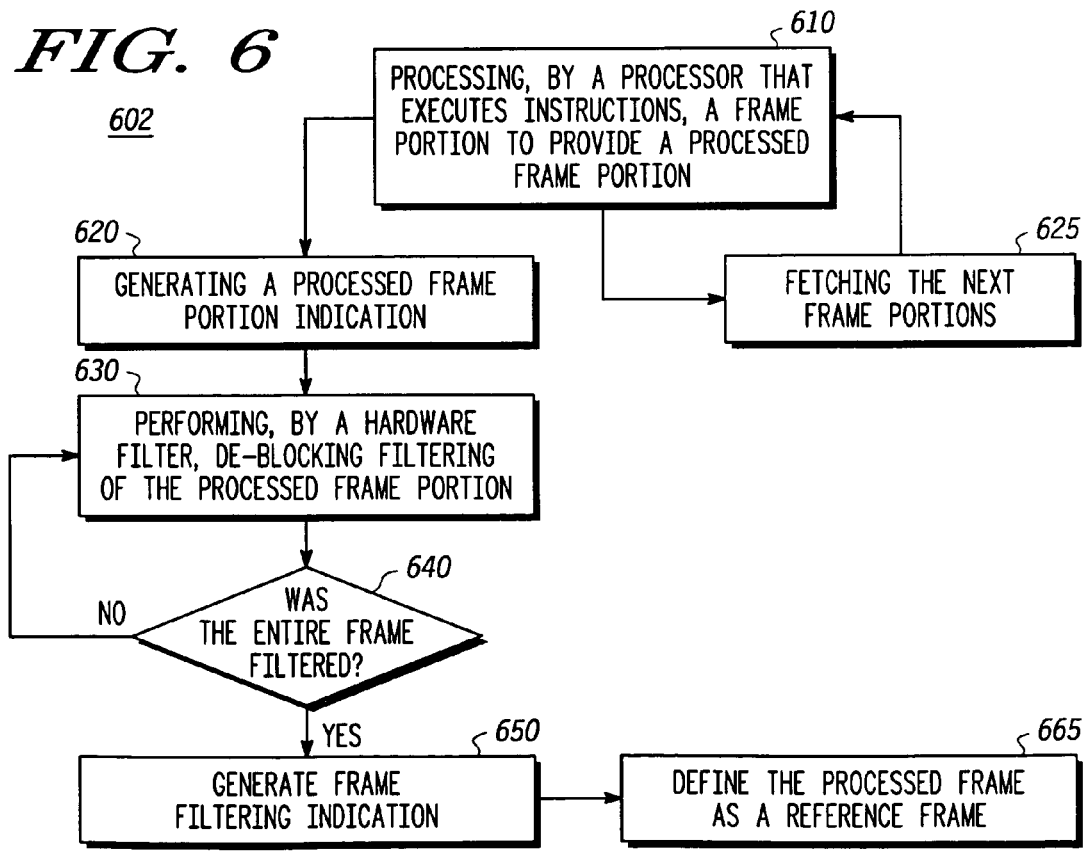

METHOD AND SYSTEM FOR PERFORMING DEBLOCKING FILTERING

FIELD OF THE INVENTION

The present invention relates to methods and systems for performing deblocking filtering.

BACKGROUND OF THE INVENTION

Methods and systems for compressing and transmitting media signals are known in the art. Compressed digital video is largely becoming the preferred medium to transmit to video viewers everywhere. Parts of the Moving Pictures Experts Group (MPEG) specifications are standardized methods for compressing and transmitting video. The Telecommunication Standardization Sector of the International Telecommunication Union (ITU-T) also defines various compression standards including H.261, H.263, H.264 and the like.

In general, MPEG as well as ITU-T standards are used today for transmitting video over terrestrial, wireless, satellite and cable communication channels and also for storing digital video.

Some standardized compression/encoding standards utilize various compression schemes, such as adaptive quantization, intra-frame encoding, inter-frame encoding, run length encoding and variable length coding. Intra-frame coding takes advantage of spatial redundancies in a picture. Inter-frame coding takes advantage of temporal redundancies from picture to picture in a video sequence. Inter-frame coding involves motion estimation and motion compensation. Motion estimation involves searching, for each block (including N×M pixels, whereas N usually equals M), within a predefined area, a best matching block. The relative positions of these blocks are referred to as motion vector. Motion compensation involves calculating the differences between each block and the best matching block and encoding said difference by a spatial transformation, such as a Discrete Cosine Transform (DCT).

The block-based encoding has resulted in blocking artifacts. These artifacts appear at the boundary of adjacent blocks. This problem is usually more acute in low bit rate transmission systems, in which substantially strong quantization operation is applied.

In order to overcome these blocking artifacts two type of deblocking filters were introduced. The first type is known as a post filter and the second type is known as a loop filter (or in-loop filter). The first type is applied after the encoding process ends while the loop filter is applied as a part of an encoding scheme. Encoders that include loop filter are characterized by better image quality.

Deblocking filters of the first and second types are described at U.S. patent application 20040076237 of Kadono et al., titled "Coding distortion removal method, moving picture coding method, moving picture decoding method, and apparatus for realizing the same, program", which is incorporated herein by reference.

U.S. patent application 20010020906 of Andrews at al., titled "deblocking filter for encoder/decoder arrangement and method for divergence reduction", which is incorporated herein by reference, describes a loop filter.

"Adaptive Deblocking Filter", by P. List, A. Joch, J. Lainema, G. Bjontegaard and M. Karczewicz, IEEE transactions on circuits and systems for video technology, Vol. 13, No. 7, July 2003, which incorporated herein by reference, describes a H.264/MPEG-4 compliant adaptive deblocking filter.

A typical deblocking filter, and especially an H.264/MPEG-4 compliant deblocking filter can apply different filtering operation (in other words—operate in various filtering modes) in response to a boundary strength parameter. The different filtering modes differ by the strength of deblocking filtering applied to the image data.

The deblocking filtering is very complex and requires many computational resources. Typically, a processor that executes dedicated software implements the deblocking filtering process. This approach has two main disadvantages—the processor is relatively power consuming and is also occupied with many tasks that are halted during the whole encoding process.

There is a need to provide an efficient system and method for performing deblocking filtering, especially in cellular phones.

SUMMARY OF THE PRESENT INVENTION

A method for filtering a frame, the method includes: (i) processing, by a processing unit executing instructions, at least one portion of a frame to provide at least one processed frame portion; (ii) performing, by a hardware filter, deblocking filtering of the at least one processed frame portion to provide at least one filtered frame portion; and (iii) storing the at least one filtered frame portion in a memory unit that is accessible by the processing unit; whereas the stage of processing is responsive to previously filtered frame portions.

A method for filtering a frame, the method includes: (i) determining whether to perform loop deblocking filtering or post deblocking filtering; (ii) processing, by a processing unit executing instructions, at least one portion of a frame to provide at least one processed frame portion, and (iii) performing, by a hardware filter, deblocking filtering of the at least one processed frame portion to provide at least one filtered frame portion; whereas the at least one filtered frame portion is utilized in response to the determination.

A system for filtering a frame, the system includes: (i) a processing unit, adapted to execute instructions such as to process at least one portion of a frame to provide at least one processed frame portion; (ii) a hardware filter, connected to the processing unit, adapted to deblocking filter the at least one processed frame portion to provide at least one filtered frame portion; and (iii) a memory unit, connected to the processing unit, adapted to store the at least one filtered frame portion; whereas the processing unit is adapted to process the-at least one portion in response to previously filtered frame portions.

A system for filtering a frame, the system includes: (i) a hardware filter that is adapted to deblocking filter at least one processed frame portion to provide at least one filtered frame portion; and (ii) a processing unit, adapted to execute instructions such as to determine whether to perform loop deblocking filtering or post deblocking filtering, and to process at least one portion of a frame to provide the at least one processed frame portion; whereas the at least one filtered frame portion is utilized in response to the determination.

BRIEF DESCRIPTION OF THE DRAWINGS

The present invention will be understood and appreciated more fully from the following detailed description taken in conjunction with the drawings in which:

FIGS. 5-8 are flow chart illustrating methods for filtering a frame, according to various embodiments of the invention.

DETAILED DESCRIPTION OF PREFERRED EMBODIMENTS

Figure 1:
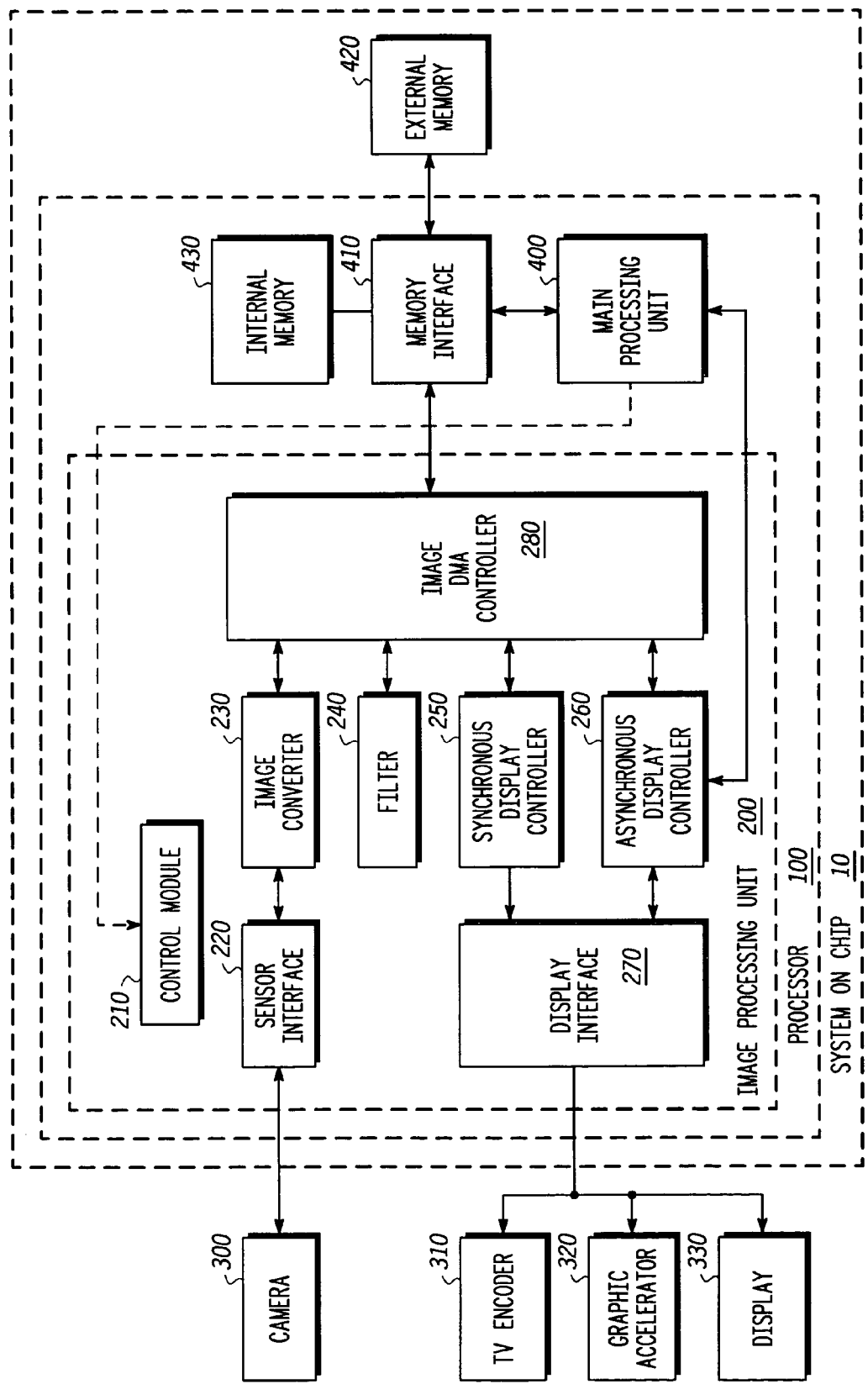
FIG. 1 is a schematic diagram of a system on chip, according to an embodiment of the invention.

FIG. 1 illustrates a system on chip 10 that includes an external memory 420 and a processor 100. The processor 100 includes the IPU 200 as well as a main processing unit 400. Main processing unit 400 (also known as "general purpose processing unit", "digital signal processing unit" or just "processing unit") is capable of executing instructions.

The system on chip 10 includes multiple components, as well as multiple instruction, control and data buses. For simplicity of explanation only major data buses as well as a single instruction bus are shown.

According to various embodiment of the invention the IPU 200 is capable of performing various image processing operations, and interfacing with various external devices, such as image sensors, camera, displays, encoders and the like. The IPU 200 is much smaller than the main processing unit 400 and consumes less power.

The IPU 200 has a hardware filter 240 that is capable of performing various filtering operations such as deblocking filtering, de-ringing filtering and the like. Various prior art methods for performing said filtering operations are known in the art and require no additional explanation.

By performing deblocking filtering operation by filter 240, instead of main processing unit 400, the IPU 200 reduces the computational load on the main processing unit 400. In one operational mode the filter 240 can speed up the image processing process by operating in parallel to the main processing unit 400.

IPU 200 includes control module 210, sensor interface 220, image converter 230, filter 240, image Direct Memory Access controller (IDMAC) 280, synchronous display controller 250, asynchronous display controller 260, and display interface 270.

The sensor interface 220 is connected on one side to an image sensor such as camera 300 and on the other side is connected to the image converter 230. The display interface 270 is connected to the synchronous display controller (SDC) 250 and in parallel to the asynchronous display controller (ADC) 260. The display interface 270 is adapted to be connected to multiple devices such as but not limited to TV encoder 310, graphic accelerator 320 and display 330.

The IDMAC 280 facilitates access of various IPU 200 modules to memory banks such as the internal memory 430 and the external memory 420. The IDMAC 280 is connected to on one hand to the image converter 230, filter 240, SDC 250 and ADC 260 and on the other hand is connected to memory interface 410. The memory interface 410 is be connected to internal memory 430 and additional or alternatively, to an external memory 420.

The sensor interface 220 captures image data from camera 300 or from a TV decoder (not shown). The captured image data can be sent to the image converter 230 for preprocessing or post processing, but the captured data image can also be sent without applying either of these operations to IDMAC 280 the in turn sends it, via memory interface 410 to internal memory 430 or external memory 420.

The image converter 230 is capable of preprocessing image data from the sensor module 220 or post-processing image data retrieved from the external memory 420 or the internal memory 430. The preprocessing operations, as well as the post-processing operations include downsizing, resizing, color space conversion (for example YUV to RGB, RGB to YUV, YUV to another YUV), image rotation, up/down and left/right flipping of an image and also combining a video image with graphics.

The display interface 270 is capable of arbitrating access to multiple displays using a time multiplexing scheme. It converts image data form SDC 250, ADC 260 and the main processing unit 400 to a format suitable to the displays that are connected to it. It is also adapted to generate control and timing signals and to provide them to the displays.

The SDC 250 supports displaying video and graphics on synchronous displays such as dumb displays and memory-less displays, as well on televisions (through TV encoders). The ADC 260 supports displaying video and graphics on smart displays.

The IDMAC 280 has multiple DMA channels and manages access to the internal and external memories 430 and 420.

Figure 2:
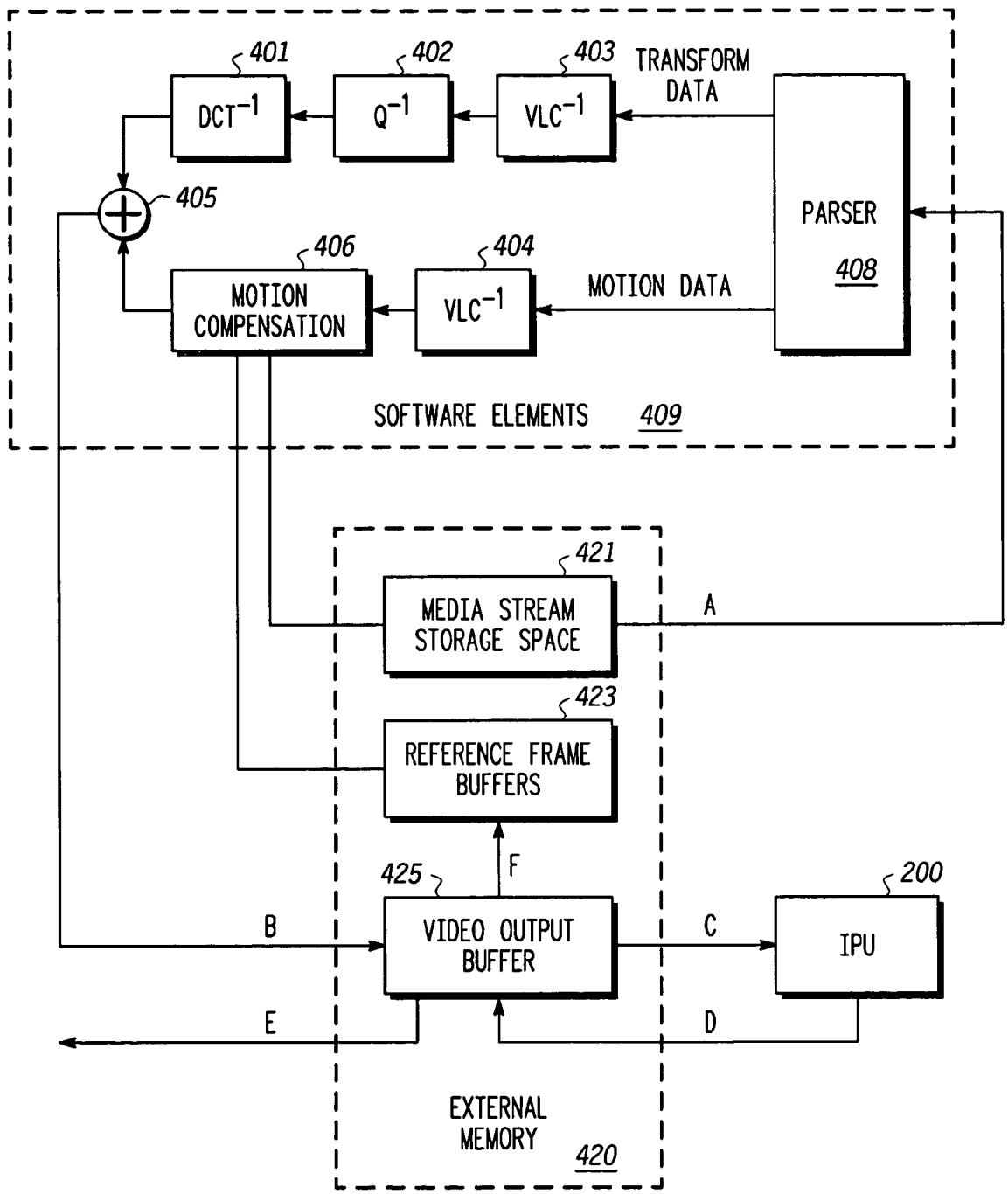
FIG. 2 is a schematic diagram of various software and hardware components that participate in frame processing and loop filtering, according to an embodiment of the invention.

Referring to FIG. 2 illustrating a various software and hardware components that participate in processing and filtering a frame, according to an embodiment of the invention. For simplicity of explanation it is assumed that image portions, processed image portions and filtered image portions are stored at various location within the external memory 420. This is not necessarily so as the information can also be stored within an internal memory 430 or within both memories 420 and 430.

According to an embodiment of the invention the order of block decoding is the same as block deblocking filtering. For example if the blocks that form an image frame are decoded in a raster scan manner (for example fro the top of the image frame and from left to right), then these image frames are also deblocking filtered as the same order. According to other embodiments of the invention this is not so, and the decoding order can differ from the deblocking filtering order. In such a case system 100 tracks the decoding process to determine which image frames can be deblocking filtered.

The main processing unit 400 operated independently to the IPU 200 and does not stall till the IPU 200 provides it with filtered image framer, but rather can execute additional tasks that are not based upon filtered image frames.

The inventors found out that the IPU 200 can perform deblocking filtering in various manners such as for both H.264 decoding and encoding.

In a first mode of operation the main processing unit 400 executes instructions such as to process a compressed media stream. The media stream includes multiple frames. This processing is represented by various boxes, including a parser 408, for accessing a compressed media stream that includes image portions, and sending transform data to a first variable length encoder ($VLC^{-1}$) 403 while sending motion data to a second variable length encoder ($VLC^{-1}$) 404. The first variable length encoder 403 is followed by a de-quantizer ($Q^{-1}$) 232 and an inverse Discrete Cosine Transform ($DCT^{-1}$) box 401. The output of the inverse Discrete Cosine Transform box 401 is sent to an adder 405 that adds said output to an output of motion compensation block 406. The second variable length encoder 404 encodes the motion data and sends the encoded motion data to a motion compensation block 406. The motion compensation block 406 also retrieves from external memory 430 previously filtered frames. Once a current frame if fully processed by the main processing unit 400 and filtered by filter 430 within IPU 200, is can be provided to a display, stored in external memory for further use and especially be accessible to the motion compensation box 406 for processing future frames.

A processing sequence of a certain frame starts by a stage of retrieving the frame or at least one frame portion (such as a row of blocks) by a parser 408. This stage is denoted (A) in FIG. 2. The certain frame portion is processed by the main processing unit 400, as illustrated by boxes 403-406, and may also be responsive to previously filtered frames. Once stage (A) ends the processed frame portion is stored (denoted as B) at video output buffer 425. The video output buffer allows simultaneous access of both the main processing unit 400 and IPU 200 to its content. Stage (B) includes notifying the IPU 200 and especially control module 210 that the deblocking filtering can initiate. It is noted that a user can program the amount of pixels that are processed before stage (C) can initiate.

Stage (C) includes fetching the processed frame portion and performing deblocking filtering, by filter 430. The filtered image portion is then sent to the video output buffer 425. It can be further processed by the main processing unit 400 (For example blending graphics with the filtered frame, and the like) and also sent to a display. Once a frame is processed and filtered it can be used for processing future frames. Stage (F) includes sending the filtered frame to the reference frame buffers 423. It is noted that stage (F) can be implemented by exchanging between pointers, without performing actual data transfer.

Conveniently, a sequence of blocks is processed before initiating the deblocking filtering. Typically, the filtering of certain sequence takes place while other block sequences of the same frame are being processed.

Conveniently, the main processing unit 400 is adapted to send the IPU 200 a processed frame portion indication, indicative of a generation of the processed frame portion. This can include setting a certain bit of a control register of the IPU 200. Conveniently, filter 240 is adapted to generate a filtered frame indication, indicative of a generation of a filtered frame.

According to an embodiment of the invention the processed frame portion indication is generated whenever the central processing unit 400 finishes to process as two block sequences, each extends through the entire width of the frame. The filter 240 notifies the main processing unit 400 that a frame was filtered by generating an interrupt.

According to another embodiment of the invention filter 430 is also capable of applying de-ringing filtering. Conveniently, the filter 430 applied deblocking filtering operations and then de-ringing filtering operations.

According to an embodiment of the invention the main processing unit 400 can determine if filter 430 is to be operated as a loop filter or as a post filter. If the main processing unit 400 determines that the filter 430 is to be operated as a post filter it sends appropriate control signals to control module 210.

According to an embodiment of the invention the filter 430 can be activated as a post filter after receiving an indication that the main processing unit finished to filter the whole frame. According to another embodiment of the invention the filter 430 can operate in parallel to the main processing unit 400 but the filtered frame it outputs is not used as reference frame by the main processing unit 400.

Figure 3:
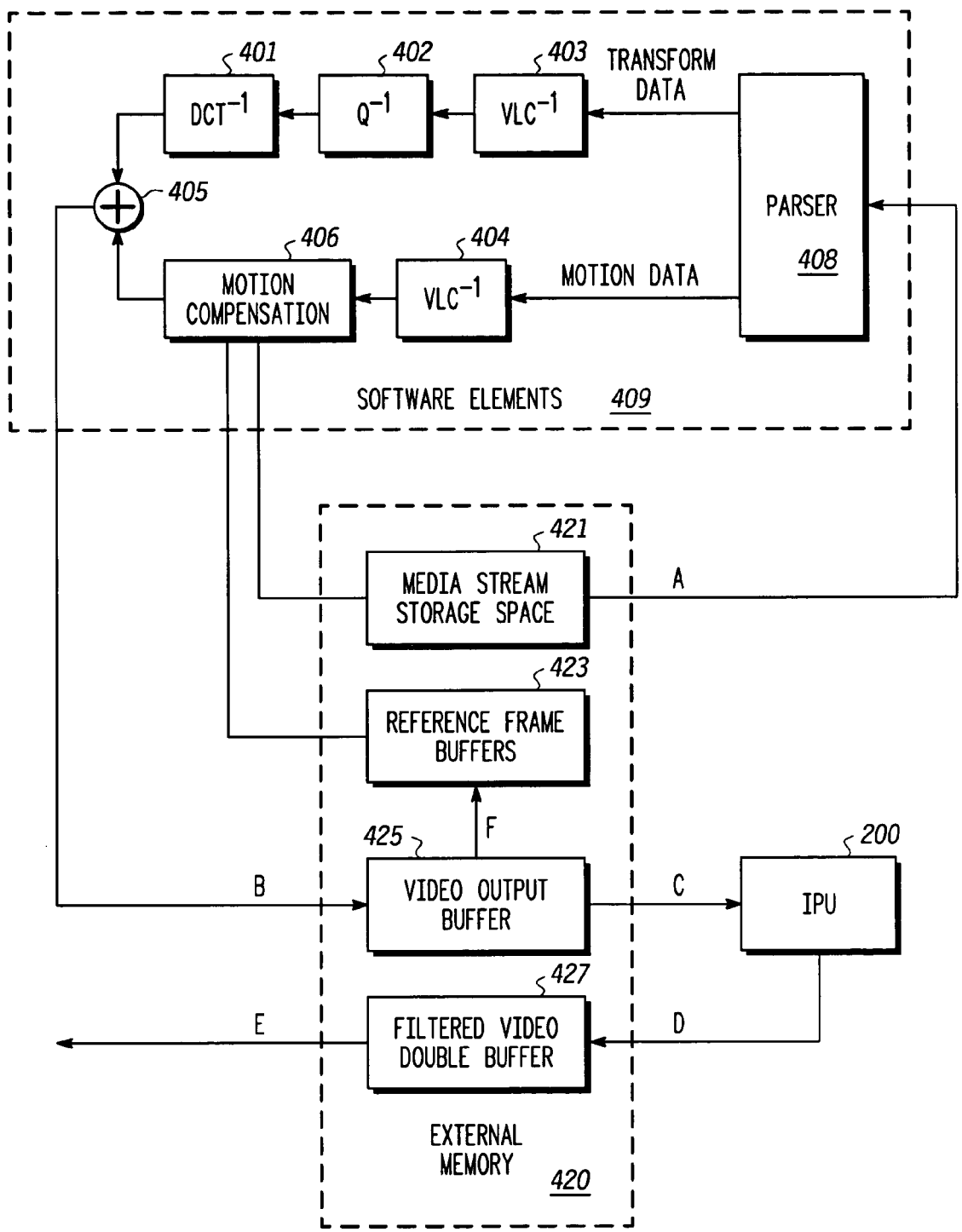
FIG. 3 is a schematic diagram of various elements that participate in frame processing and post filtering, according to an embodiment of the invention.

FIG. 3 illustrates various elements that participate in frame processing, according to an embodiment of the invention.

According to this embodiment the filter 430 is operated as a post filter in parallel to the main processing unit 400. FIG. 3 resembles FIG. 2 but there is one major difference the filtered frame is not used as a reference frame for processing future frames. Accordingly, the output of IPU 200 is not sent to the video output buffer 425 and then (once a whole frame is filtered) sent to the reference frame buffers 423. Rather, the filtered frame (the output of IPU 200) is sent (denoted by D) to a filtered video double buffer 427 (denoted by E), while the processed frame is sent from the video output buffer 425 to the reference frame buffer (denoted by F).

Figure 4:
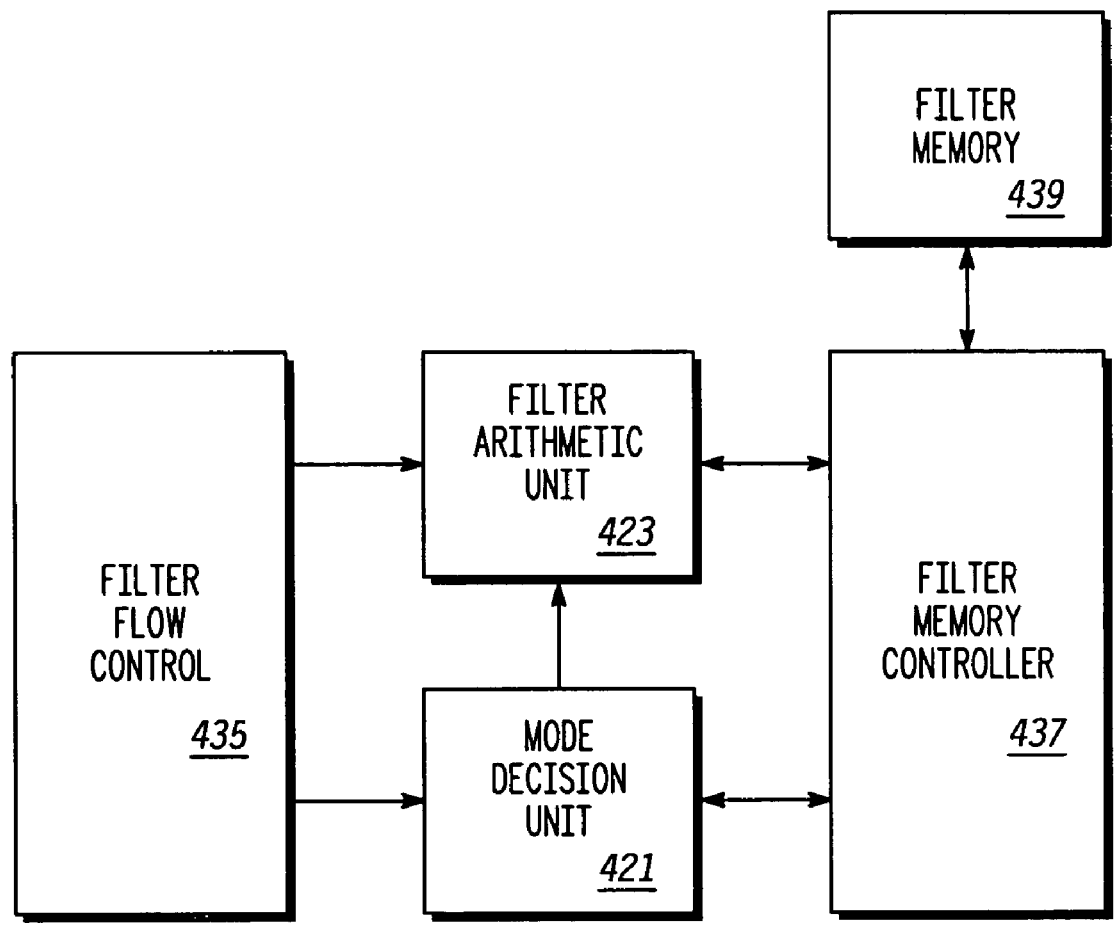
FIG. 4 illustrates a filter according to an embodiment of the invention.

FIG. 4 illustrates filter 430 according to an embodiment of the invention. Filter 430 includes a mode decision unit 431, a filter arithmetic unit 433, a filter flow controller 435, a filter memory controller 437 and a filter memory 439.

The mode decision unit 431 is connected to the filter arithmetic unit 433, to the filter flow controller 435 and to the filter memory controller 437. The filter arithmetic unit 433 is further connected to the filter flow controller 435 and to the filter memory controller 437. The filter memory controller 437 is connected to the filter memory 439 and to the IDMAC 280.

The mode decision unit 431 is adapted to determine in which mode the filter 430 operates. This is usually responsive to a boundary strength parameter. The parameter can be calculated by reading and analyzing a multiple processed pixels. The selected mode determines the filter that is applied by the filter arithmetic unit 433. Intermediate results of the filtering process, as well as filtered blocks, are stored within the filter memory 439. The filter flow controller 435 controls the operation of filter 430 and is capable of timing deblocking filtering, deranging filtering and the like. The filter flow controller 435 is capable of receiving the processed frame portion indication and of generating a filtered frame indication. Filtered blocks are retrieved from the filter memory 439 and are sent, via the filter memory controller 437, to IDMAC 280.

According to an embodiment of the invention the filter 430 receives processed Y, U and V frame portions and starts to process the Y frame until a certain row. The main processing unit 400 indicates that it finished to process the whole frame and the filter 430 filters the remaining Y frame, the U frame and the V frame.

FIG. 5 is a flow chart illustrating method 600 for filtering a frame, according to an embodiment of the invention.

Method 600 starts by stage 610 of processing, by a processing unit executing instructions, a frame portion to provide a processed frame portion. The frame portion includes multiple pixels that can be arranged at rows or columns or even at blocks.

Stage 610 is followed by stages 620 and 625. Stage 625 includes fetching the next frame portion. Stage 625 is followed by stage 610 to perform a loop of frame portions fetching operations. This loop can be stopped whenever the whole frame is fetched, but this is not necessarily so. The loop can be stopped when a certain control criterion is fulfilled.

Stage 620 includes generating a processor frame portion indication that indicates that a processed frame portion is available for filtering.

Stage 620 is followed by stage 630 of performing, by a hardware filter, deblocking filtering of the processed frame portion to provide a filtered frame portion.

Stage 630 is followed by stage 640 of checking if the whole frame was filtered. If the answer is negative then stage 640 is followed by stage 630. It is noted that stage 630 can be executed if a new frame portion is available, else stage 630 can be delayed until such processed frame portion is available. If the whole frame was filtered then stage 640 is followed by stage 650 of generating a frame filtered frame indication, indicative of a generation of a filtered frame. The filtered frame can be provided to a display, stored in a memory and also be defined as a reference frame that can be used while processing future frames. Stage 660 illustrates the latter option, although the other two options can also be implemented.

According to an embodiment of the invention the hardware filter can also process an indication whenever a certain amount of pixels is filtered, even if the amount is not equal to a frame.

FIG. 6 is a flow chart illustrating method 602 for post filtering a frame, according to an embodiment of the invention. Method 600 resembles method 602 in that both the processing unit and filter 430 operate in parallel. The major difference is that the reference frame is the processed frame (as indicated by stage 665 that replaces stage 660 of FIG. 5). It is noted that the definition of the processed frame as a reference frame can be initiated after the processing is finished, and not (as illustrated by FIG. 5) after the filtering is finished.

Figure 7:
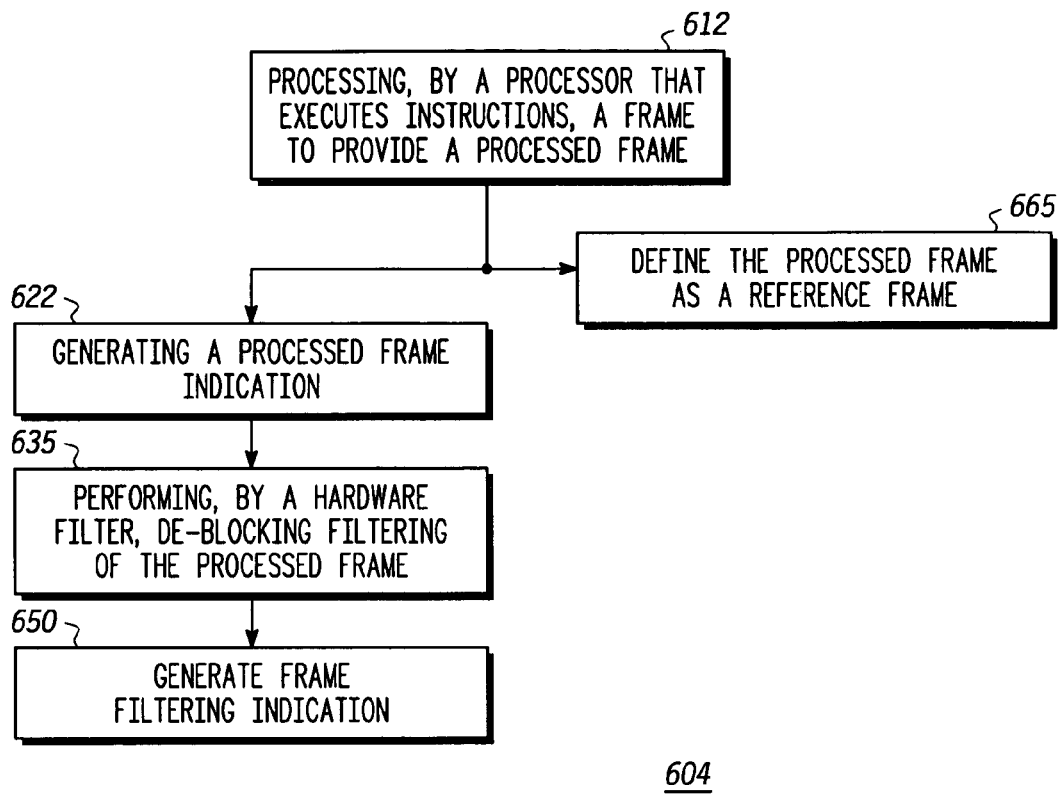

FIG. 7 is a flow chart illustrating method 604 for post filtering a frame, according to an embodiment of the invention. According to this embodiment the filter 430 performs deblocking filtering after the processing unit 400 finished to process a frame. These components do not work in parallel, at least in respect to the same frame.

Method 604 starts by stage 612 of processing, by a processing unit executing instructions, a frame to provide a processed frame. Stage 612 can include multiple iterations of stages such as stage 610 and 625 of FIG. 6.

Stage 610 is followed by stages 622 and 665. Stage 622 includes generating a processor frame indication that indicates that a processed frame is available for filtering. Stage 665 include defining the processed frame as a reference frame for the processing of future frames.

Stage 622 is followed by stage 625 of performing, by a hardware filter, deblocking filtering of the processed frame to provide a filtered frame. Stage 625 is followed by stage 650 of generating a filtered frame indication, indicative of a generation of a filtered frame.

Figure 8:
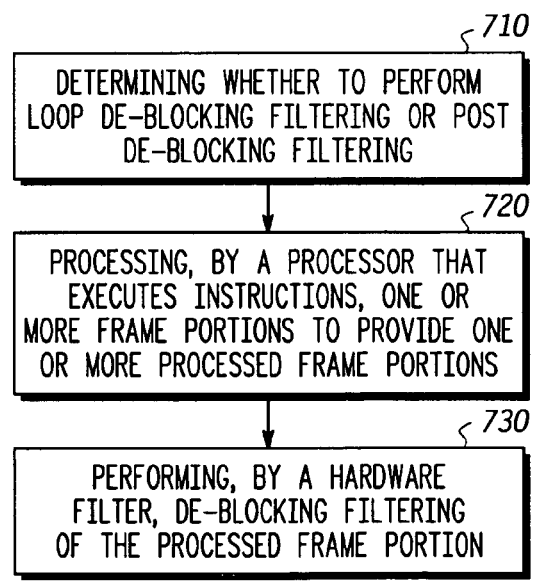

FIG. 8 is a flow chart for method 700 for filtering a frame, according to an embodiment of the invention. Method 700 starts by stage 710 of determining whether to perform loop deblocking filtering or post deblocking filtering. The determination is usually made by the main processing unit 400, in response to instructions fed by the system on chip designer.

Stage 710 is followed by stages 720 and 730. These stages can occur in parallel or in a sequential manner. In other words the whole frame can be first processed and only then filtered, but this is not necessarily so and a first portion of frame can be filtered while another portion is processed. For simplicity of explanation stage 720 is drawn above stage 730.

Stage 720 includes processing, by a processing unit executing instructions, at least one portion of a frame to provide at least one processed frame portion.

Stage 730 includes performing, by a hardware filter, deblocking filtering of the processed frame portions to provide filtered frame portions.

The stage of processing is responsive to reference frames. According to the determination of stage 710 these can be either filtered frames or processed frames.

It is noted that if stage 710 determines to perform loop deblocking filtering than the stages of method 600 can be executed. If stage 710 determines to perform post deblocking filtering then either the stages of methods 602 or 604 can be applied.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

We claim

1. A method for filtering a frame, the method comprises:
determining whether to perform loop deblocking filtering or post deblocking filtering;
configuring a hardware filter to operate as a loop deblocking filter or a post deblocking filter according to the determination;
determining, by a mode decision unit of the hardware filter, which filter to be applied by a filter arithmetic unit of the hardware filter;
processing, by a processing unit executing instructions, at least one portion of a frame to provide at least one processed frame portion,
performing, by a hardware filter of an image processing unit that is coupled to the processing unit, deblocking filtering of the at least one processed frame portion to provide at least one filtered frame portion; wherein the processing unit operates independently of the image processing unit;
wherein the at least one filtered frame portion is utilized in response to the determination;
wherein the deblocking filtering utilizes the filter arithmetic unit;
wherein if determining to perform loop deblocking then processing, by the processing unit, a frame portion while loop deblocking filtering another frame portion of the same frame; and
displaying processed frames.

2. The method of claim 1 wherein if determining to perform post deblocking filtering then the stage of performing deblocking filtering of at least one frame portion is executed after the stage of processing of the whole frame is completed.

3. The method of claim 1 further comprising a stage of generating a processed frame indication, indicating that a frame was processed by the processing unit.

4. The method of claim 1 wherein if determining to perform loop deblocking filtering then the at least one filtered frame portion is utilized during a stage of processing another frame.

5. The method of claim 1 further comprising generating, by the processing unit, a processed frame portion indication, indicative of a generation of the processed frame portion.

6. The method of claim 1 further comprising generating, by the hardware filter, a filtered frame indication, indicative of a generation of a filtered frame.

7. The method of claim 1 further comprising generating, if determining to perform post deblocking, a processed frame portion indication, indicative of a generation of the processed frame portion.

8. The method of claim 1 further comprising determining which at least one frame portion to process before proceeding to the stage of performing, by the hardware filter, deblocking filtering.

9. The method of claim 1 wherein the determining, by the mode decision unit of the hardware filter, which filter to be applied by the filter arithmetic unit of the hardware filter is responsive to a boundary strength parameter.

10. The method of claim 1 further comprising operating the processing unit at a low power consuming operational mode after the processing unit completed to process a frame.

11. The method of claim 1 further comprising a preliminary stage of pre-processing at least one frame portion.

12. The method of claim 1 wherein the processing comprises applying variable length encoding, de-quantizing and applying inverse discrete cosine transform operations.

13. A system for filtering a frame, the system comprises:
a hardware filter that is adapted to be configured as a loop deblocking filter or as a post deblocking filter such as to deblocking filter at least one processed frame portion to provide at least one filtered frame portion;
wherein the hardware filter comprises a mode decision unit that determines which filter to be applied by a filter arithmetic unit of the hardware filter; and
a processing unit that operates independently of an image processing unit in which the hardware filter is comprised; wherein the processing unit is adapted to execute instructions such as to determine whether to perform loop deblocking filtering or post deblocking filtering, and to process at least one portion of a frame to provide the at least one processed frame portion;
wherein the at least one filtered frame portion is utilized in response to the determination;
wherein if the processing unit determines to configure the hardware filter as a loop deblocking filter then the processing unit process a frame portion while the hardware filter performs loop deblocking filtering of another frame portion of the same frame.

14. The system of claim 13 wherein if configuring the hardware filter as a post deblocking filter then the hardware filter performs post deblocking of at least one frame portion after the processing unit processes the whole frame.

15. The system of claim 13 wherein the processing unit is adapted to generate a processed frame indication, indicating that a frame was processed by the processing unit.

16. The system of claim 13 wherein the hardware filter is adapted to deblocking filter of an image portion in parallel to a frame portion process by the processing unit.

17. The system of claim 13 wherein the processing unit is adapted to utilize filtered frames during the processing of another frame is the processing unit determined to apply loop deblocking filtering.

18. The system of claim 13 wherein the processing unit is adapted to generate a processed frame portion indication, indicative of a generation of the processed frame portion.

19. The system of claim 13 wherein the hardware filter is adapted to generate a filtered frame indication, indicative of a generation of a filtered frame.

20. The system of claim 13 wherein the processing unit is adapted to generate a processed frame indication if the processing unit determined to apply a post deblocking filtering.

21. The system of claim 13 wherein the processing unit is adapted to determine which at least one frame portion to process before performing deblocking filtering.

22. The system of claim 13 wherein the processing unit is adapted to operate in a low power consuming operational mode after the completing to process a frame.

23. The system according to claim 13 wherein the mode decision unit determines which filter to be applied by the filter arithmetic unit in response to a boundary strength parameter.

24. The system according to claim 13 wherein an order of decoding blocks of the frame by the processing unit differs from an order of the deblocking filtering of blocks of the frame by the hardware filter.

25. The method according to claim 1 wherein an order of decoding blocks of the frame by the processing unit differs from an order of the deblocking filtering of blocks of the frame by the hardware filter.

26. The system of claim 13, wherein the hardware filter is configured to consume less power than the processing unit for deblocking filtering the processed frame portion.

27. The system of claim 13, wherein the hardware filter is to receive processed Y, U and V frame portions, start to process the Y frame until a certain row, and filter the remaining Y frame, the U frame and the V frame after the processing unit indicates that processing the whole frame is completed.

28. The system of claim 19, wherein the hardware filter is adapted to generate the filtered frame indication when an amount of pixels that have been filtered is less than a total number of pixels in a frame.

29. The system of claim 18, wherein the processing unit is configured to generate the processed frame portion indication whenever the processing unit finishes processing pairs of block sequences, each block sequence extending through the entire width of the frame.

30. The system of claim 13, wherein the hardware filter is configured to prevent from deblocking filtering processed frame portions of a frame before the processing unit has processed at least a predetermined amount of pixels, said predetermined amount of pixels programmed by a user.

* * * * *